United States Patent

Kalyk

[15] 3,658,122
[45] Apr. 25, 1972

[54] BABY BOTTLE WARMING CONTAINER AND METHOD OF ATTAINING THERMAL EQUILIBRIUM

[72] Inventor: Harvey Nicholas Kalyk, 2462 Valleyview Drive, Kamloops, British Columbia, Canada

[22] Filed: May 19, 1970

[21] Appl. No.: 38,789

[52] U.S. Cl. ................ 165/1, 73/343 B, 126/261, 165/80
[51] Int. Cl. ........................................... A47g 23/04
[58] Field of Search .............. 126/261; 165/80, 11, 1; 215/11 A; 73/343 B, 344; 150/2.2

[56] References Cited

UNITED STATES PATENTS

| 1,979,666 | 11/1934 | Reese | 126/261 |
| 803,756 | 11/1905 | Gwynne | 126/261 X |
| 1,485,159 | 2/1924 | Bartholomew | 126/261 |
| 1,828,628 | 10/1931 | Torgerson | 126/261 |
| 1,841,516 | 1/1932 | Andrews | 215/11 A |
| 2,220,777 | 11/1940 | Othmer | 126/261 X |
| 2,778,921 | 1/1957 | Jepson | 99/447 X |

Primary Examiner—Charles J. Myhre
Attorney—Polachek, Saulsbury & Hough

[57] ABSTRACT

A method of warming a baby bottle containing a cold beverage involves immersing the baby bottle in a container of hot water and leaving the bottle in the hot water until the beverage and water are in thermal equilibrium. A calibrated scale on the container indicates when thermal equilibrium is attained. The scale may indicate warming time periods depending on the quantity of beverage in the bottle. The scale may be calibrated in association with a thermometer to indicate when thermal equilibrium is attained, the thermometer being arranged to measure the temperature of the water or other heating liquid in the container.

9 Claims, 6 Drawing Figures

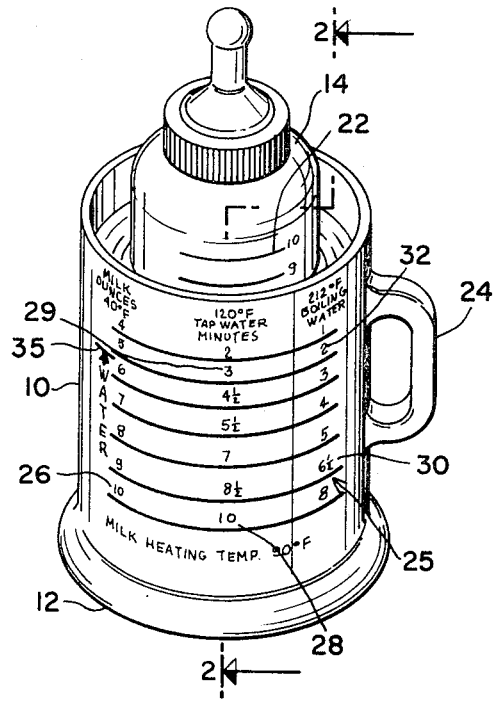

PATENTED APR 25 1972  3,658,122

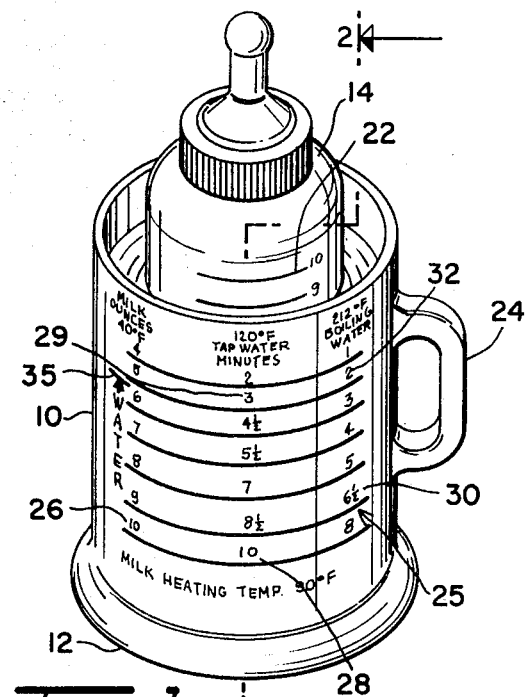
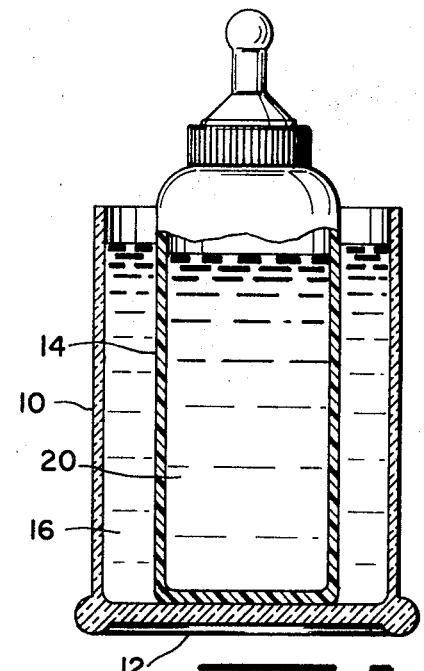
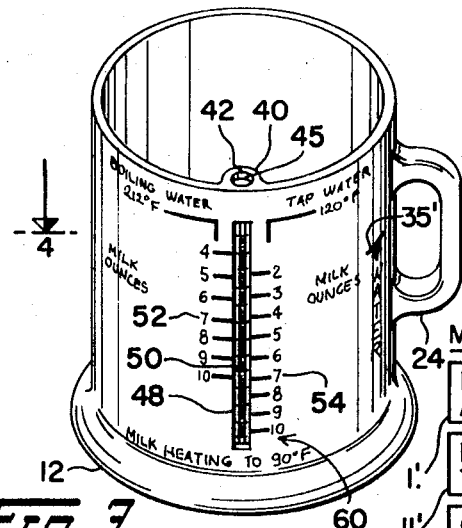
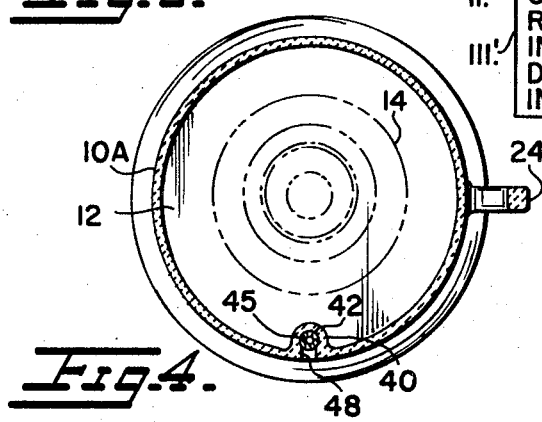

METHOD 1.

I. FILL BABY BOTTLE WITH COLD BEVERAGE

II. FILL BOTTLE WARMER WITH HOT WATER TO MARKED LEVEL

III. TIME WARMING: REFER TO CALIBRATED SCALE FOR BOILING WATER OR TAP WATER: REMOVE HEATED BABY BOTTLE AT END OF TIME

*Fig. 5.*

METHOD 2.

I.' FILL BABY BOTTLE WITH COLD BEVERAGE

II.' FILL BOTTLE WARMER WITH HOT WATER TO MARKED LEVEL

III.' OBSERVE CALIBRATED THERMOMETER: REMOVE HEATED BOTTLE WHEN READING FALLS TO RIGHT OR LEFT SCALE DEPENDING ON AMOUNT OF BEVERAGE IN BABY BOTTLE

*Fig. 6.*

INVENTOR.
HARVEY NICHOLAS KALYK
BY Polacheck & Saulsbury
ATTORNEYS

BABY BOTTLE WARMING CONTAINER AND METHOD OF ATTAINING THERMAL EQUILIBRIUM

Conventional baby bottle warmers generally are equipped with an electrical heating element. Typical devices of this type are shown in U.S. Pats. Nos. 3,247,360 and 2,546,983. The conventional baby bottle warmers have a number of disadvantages. In the first place, a convenient electrical outlet must be provided. Secondly, the prior bottle warmers provide no indication as to when the contents of the baby bottle are warm enough. Thirdly, the prior bottle warmers are not safe for children to handle. Fourthly, there is no way to adjust the prior bottle warmers to stop warming when the correct temperature is reached. As a result the milk or other beverage in the baby bottle is either overheated or underheated.

The present invention provides a method and means for overcoming this situation. According to the invention a baby bottle warmer is calibrated so that after a predetermined time thermal equilibrium is established between heated water in the bottle warmer and a beverage in the baby bottle. The heating time will depend on the initial water temperature, on the quantity of hot water, the quantity of beverage in the baby bottle, the initial temperature of the beverage, and on ambient room temperature. Certain of these variables can be standardized such as the initial temperature of the hot water, the quantity of hot water, the room temperature, initial temperature of the beverage, and the final temperature of the beverage. Thus the only major variable will be the quantity of beverage in the baby bottle. Since all other factors are constants, or predetermined, the baby bottle warmer can be calibrated according to the quantity of beverage in the bottle. At the end of a predetermined time, the beverage in the bottle will be at a desired temperature.

The baby bottle warmer is marked with appropriate calibration scales. In a modification of the invention, the temperature of the water in the baby bottle warmer is measured or sensed but a calibrated scale indicates that, temperature equilibrium is attained and the beverage in the baby bottle is heated properly, according to the initial amount of beverage in the bottle and the initial temperature of the water in the bottle warmer.

The basic principle of the invention involves heating any desired known quantity of cold beverage such as milk in a baby bottle by immersing the bottle for a predetermined time in a baby bottle warming container containing hot water or other hot liquid; and using a calibrated scale to indicate when thermal equilibrium is reached and the beverage in the baby bottle is properly heated. During the warming period, the container and bottle are exposed to ambient room temperature which is assumed to be at approximately 70° F.

Other and further features, objects and advantages of the invention will become apparent from the following detailed description taken together with the drawings, wherein:

FIG. 1 is a perspective view of a baby bottle warming container embodying the invention, with a baby bottle containing a beverage in the container.

FIG. 2 is a vertical sectional view taken on line 2—2 of FIG. 1.

FIG. 3 is a perspective view of another baby bottle warmer.

FIG. 4 is a horizontal sectional view taken on line 4—4 of FIG. 3.

FIG. 5 and FIG. 6 are flow charts showing methods of practicing the invention.

Referring first to FIGS. 1 and 2, there is shown a baby bottle warming container 10 having a cylindrical body open at the top. A wider bottom 12 provides mechanical stability to the container. A closed generally cylindrical baby bottle 14 can be inserted into the open top of the container to rest on the circular bottom 12. Hot water 16 or other hot liquid can be poured into container 10. Baby bottle 14 can contain any desired quantity of cold milk or other beverage 20. The quantity of beverage will be measured quantitatively by scale 22 on the bottle. Container 10 may have a lateral handle 24.

On the outer side of container 10 is a calibrated scale 25. This has one column 26 indicating numerically various quantities of beverage 20 in baby bottle 14. Adjacent to column 26 is column 28 indicating by numerals 29 heating times in minutes for hot tap water of approximately 120° F. Adjacent to column 28 is another column 30 indicating by numerals 32 heating times in minutes for boiling water having an initial temperature of approximately 212° F.

FIG. 5 indicates steps in Method 1 for practicing the invention. In step I baby bottle 14 is filled with a desired quantity of cold beverage 20. In step II the baby bottle warmer 10 is filled with hot water to a specified level indicated by mark 35 on the outside of the container. Suppose scale 25 has been calibrated on the assumption that the cold beverage 20 is approximately 40° F when taken out of a refrigerator, and the room temperature is 70° F. Suppose also that the hot water is assumed to be either tap water having a temperature of 120° F or freshly boiled water having a temperature of about 212° F. By referring to either column 28 or 30 depending on which one is applicable, and also depending on the initial quantity of beverage 20, one of numerals 29 or 32 will show the required heating time period in minutes. A variation in timing of plus or minus 10 percent will be tolerable. The beverage 20 will not be objectionably overheated or underheated. The setting of water level mark 35 can be such that at the end of the time indicated by column 28 or 30, both the heating liquid 16 and the heated beverage 20 will be substantially the same, that is in thermal equilibrium. This temperature can be predetermined for example at 90° F. After this condition is reached, both the liquid 16 and beverage 20 will cool at the same rate. If the bottle 14 is removed from container 10 within two or three minutes thereafter, the contents of bottle 14 will be at a satisfactory feeding temperature for an infant. If a cooler beverage is desired, the bottle 14 can be left immersed for a shorter time than is indicated on scale 25 or a smaller quantity of hot water 16 can be used. In general, optimum conditions will prevail when the beverage rises in temperature while the temperature of heating liquid 16 falls in temperature until both are at the same temperature. This condition of thermal equilibrium should occur at 90° F or whatever is the optimum feeding temperature for beverage 20. The performance of step III as stated in FIG. 1 thus involves timing the warming period with any suitable timer, referring to the proper column of scale 25, and removing bottle 14 from warming container 10 at the end of the specified time or shortly thereafter.

FIGS. 3 and 4 show another baby bottle warming container 10A which can be used to perform Method 2 stated in FIG. 6. Container 10A is similar to container 10 and corresponding parts are identically numbered. In the wall of container 10A is a radially inward projecting portion 40 which extends longitudinally of the container body. A longitudinal bore 42 is provided in wall portion 40 to receive a thermometer 45. The outer side of the body wall is open laterally to provide a window 48 through which the mercury or other indicating liquid 50 of the thermometer is visible. Adjacent to window 48 and thermometer 45 are two columns 52, 54 of a calibrated scale 60. The columns as shown in FIG. 3 are calibrated with numerals to indicate the initial quantity of milk or other beverage 20 in the baby bottle 14, depending on the initial temperature of the heating liquid 16. In this arrangement no timer is necessary. When the level of indicating liquid 50 falls to the index mark and numeral on scale 52 or scale 54 corresponding to the initial water temperature, thermal equilibrium is reached and the beverage 20 in bottle 14 is properly heated.

According to Method 2 of FIG. 6, bottle 14 is filled in step I' with a desired quantity of beverage 20. Then in step II' the container 10A is filled to marked level 35' with hot tap water or boiling water. In step III', the calibrated thermometer reading falls to the thermal equilibrium scale reading depending on the amount of beverage 20 in the bottle.

It will be apparent that the method is absolutely safe. Children can be trusted to heat a baby bottle without danger of overheating the beverage in the bottle. Positive indications are provided when thermal equilibrium is attained. No power cord or electrical power is required. If desired the container 10 or 10A containing liquid 16 can be heated on a stove until the liquid is hot enough. Then the container 10 or 10A will be removed from the stove and bottle 14 will be placed in the container. Container 10 or 10A can be made of glass, metal, plastic, ceramic or other suitable material or combination of materials. Bottle 14 can be glass, plastic, or of other suitable material. Bottle 14 can be of rewashable type of of disposable type. It is preferable that container 10 or 10A have a simple single wall construction to minimize cost and assure a rigid durable structure and long useful life of the appliance. The wall of baby bottle warming container can have thermal insulating properties.

What is claimed is:

1. A method of heating a baby bottle containing a predetermined quantity of cold beverage at an initial predetermined temperature, comprising the steps of immersing the bottle in a predetermined quantity of hot liquid having a predetermined temperature; leaving the bottle in the hot liquid for a predetermined time until a condition of thermal equilibrium has been attained when the temperature of the hot liquid and the temperature of the cold beverage equalize; referring to a calibrated scale indicating a time period necessary for said thermal equilibrium to be attained; and removing the bottle containing the heated beverage from said liquid at the end of said time period at which said condition of thermal equilibrium has been attained.

2. A method of heating a baby bottle as defined in claim 1, comprising the further step of timing the period during which the bottle is left in the hot liquid.

3. A method of heating a baby bottle as defined in claim 1, comprising the further step of measuring the temperature of said liquid and correlating the temperature of said liquid with the temperature of said beverage.

4. A baby bottle warming container, comprising a cylindrical body having an open top and closed bottom for containing a quantity of hot liquid and for supporting therein in axially upright position a bottle containing a quantity of cold beverage; and a scale on the exterior of said body calibrated to indicate when said hot liquid and said cold beverage have attained a condition of thermal equilibrium and equality.

5. A baby bottle warming container as defined in claim 4, wherein said scale is calibrated to indicate numerically immersion times for said bottle in said liquid depending on the initial temperature of said liquid and the initial quantity of said beverage in said container.

6. A baby bottle warming container as defined in claim 4, wherein said scale is calibrated to indicate numerically quantities of beverage in said bottle.

7. A baby bottle warming container as defined in claim 4, further comprising a thermometer arranged to measure the temperature of the liquid in said container, said scale being correlated with said thermometer so that the thermometer indicates said condition of equilibrium.

8. A baby bottle warming container as defined in claim 7, wherein said scale is calibrated numerically in terms of the quantity of said beverage in said bottle.

9. A baby bottle warming container as defined in claim 4, wherein said container has a body wall formed with a lateral external window and longitudinal bore, said thermometer being inserted in said bore and visible laterally through said window.

* * * * *